United States Patent [19]

Henke

[11] Patent Number: 4,591,333

[45] Date of Patent: May 27, 1986

[54] IMPINGEMENT OVEN WITH RADIANT PANEL

[75] Inventor: Mitchell C. Henke, Fort Wayne, Ind.

[73] Assignee: Lincoln Manufacturing Company, Inc., Fort Wayne, Ind.

[21] Appl. No.: 716,339

[22] Filed: Mar. 26, 1985

[51] Int. Cl.⁴ .......................... F27D 5/00; F27B 9/00; A23L 3/00; A21B 1/00

[52] U.S. Cl. ......................................... 432/10; 99/386; 99/401; 99/443 C; 99/447; 126/21 A; 432/11; 432/148

[58] Field of Search .................. 432/10, 148, 149, 11; 126/21 A; 99/386, 401, 443 C, 447

[56] References Cited

U.S. PATENT DOCUMENTS

| | | | |
|---|---|---|---|
| 784,854 | 3/1905 | Grace | 432/148 |
| 2,908,235 | 10/1958 | Naylor et al. | 432/159 |
| 4,154,861 | 5/1979 | Smith | 34/3 X |
| 4,383,823 | 5/1983 | Williams et al. | 432/148 |
| 4,438,572 | 3/1984 | Kaminski | 34/218 |
| 4,506,652 | 3/1985 | Baker et al. | 126/21 A |

Primary Examiner—John J. Camby
Attorney, Agent, or Firm—Jeffers, Irish & Hoffman

[57] ABSTRACT

A food preparation oven for baking foods which require less heat energy input into a first surface than into a second surface such as pizzas. A radiant panel is provided which is heated by means of hot air and which is positioned to heat one surface of the food product by radiant heat energy. The second surface of the food product is heated by means of a flow of hot air. The air is heated in a heating chamber and recirculated by means of a fan. The food product is supported on a conveyor belt and travels through the food preparation oven while it is being baked.

25 Claims, 11 Drawing Figures

IMPINGEMENT OVEN WITH RADIANT PANEL

BACKGROUND OF THE INVENTION

This invention relates to an oven for preparing food products. More specifically this invention relates to an oven including two heating means which supply heat energy to a food product at two different rates. This invention furthermore relates to an oven for preparing a food product wherein one surface of the food product must be heated at a first energy input rate and wherein a second surface of the food product must be heated at a second energy input rate, the second rate being greater than the first rate.

With the popularity of fast food restaurants a variety of fast foods have become popular. The speed at which these foods are prepared is extremely important as both the restaurant operators and the diners prefer that the food be prepared in a very short amount of time so that a diner needs to wait for his food only a relatively short amount of time. However, the speed at which the food is prepared should not detract from the quality of the food. Thus, a variety of ovens have been developed which are specially suited for preparing various types of foods in a short amount of time.

Certain types of food require that the rate of heat energy input into one surface of the food product be different than the rate of heat energy input into another surface of the food product. This is particularly true with a food such as pizzas. Pizza has become a very popular fast food and a number of different types of pizzas have become popular. Pizzas normally have a crust, a filling composed of vegetables, meats, and cheeses, and a top layer of cheese onto which may be placed a variety of toppings. Thus, the top surface of the pizza requires that a limited amount of heat energy input is provided so that the cheeses will melt, and after baking will have a milky white appearance with just a small amount of brown spots thereon. At the same time the crust, or bottom surface of the pizza, must be browned. Certain pizza products which have become very popular are referred to as "deep dish" or "stuffed" pizzas. These pizzas have a much greater thickness or cross section than conventional pizzas and therefore require a greater amount of heat energy input. However, only a small amount of heat energy can be supplied through the top of a pizza since application of a large amount of heat to the top surface would cause the cheese to burn, which is, of course, undesirable. Therefore, pizza products and in particular very thick pizza products require that the rate of heat energy input into the top surface of the pizza be much lower than the rate of heat energy input into the bottom surface of the pizza. What is therefore desired for preparing pizza products in a short amount of time is an oven wherein a large amount of heat energy is applied to the bottom surfaces of the pizzas and a much smaller amount of heat energy is applied to the top surfaces of the pizzas.

A method which has been used successfully for preparing pizzas is described in U.S. Pat. No. 4,154,861. This patent discloses an impingement process wherein a conveyor belt travels through an oven cavity on which the pans containing the pizzas are located. Columns of hot air are directed at localized areas of the pizza containers to bake the pizzas and to carry away moisture and other particles resulting from the cooking process. This method has been used successfully by pizza establishments. However, if this type of oven were to be used with stuffed types of pizzas the tops of the pizzas would be burned while the crusts of the pizzas and the inside of the pizzas would not yet be properly baked.

U.S. Pat. No. 4,462,383 discloses an impingement oven for preparing foods. A pair of duct fingers is provided, each having a jet plate through which hot air is emitted in standing columns to impinge upon food products located in an oven cavity between the duct fingers. The food travels on a conveyor belt through the oven cavity between the duct fingers while it is being cooked.

It should be noted that if the temperatures in the impingement oven were to be lowered so that the top surfaces of the pizzas would not burn, the temperatures in the oven would be too low to effectively prepare the inside of the pizza products in the desired amount of time. Alternatively, if low cooking temperatures were used, the process for properly baking the pizza would be longer than desired. It is therefore desired to provide an impingement oven wherein the heat energy supplied to the bottom surface of a pizza is greater than the heat energy which is supplied to the top surface of a pizza.

Frequently, a fast food establishment will serve both thin conventional pizzas and stuffed pizzas. However, restaurant operators frequently wish to use only a single oven to prepare both thin pizzas and stuffed pizzas at the same time. Thus, an oven might have in it at same time one or more thin pizzas and one or more stuffed pizzas. It is therefore desired to provide an oven which is capable of preparing both thin conventional pizzas and stuffed pizzas at the same speed and in the same amount of time.

SUMMARY OF THE INVENTION

The present invention, in one form thereof overcomes the disadvantages of the above described prior art ovens by providing an improved oven for baking a food product therein. The invention is directed to a food preparation oven wherein the rate of heat energy input required is less for one surface of a food product than for a second surface of the food product. The oven according to the present invention comprises an enclosure for receiving a food product and a surface for supporting the food product. Means are provided for supplying heat energy to the bottom surface of the food product at a rapid rate and for supplying heat energy to the top surface of the food product at a lower rate.

The present invention, in one form thereof, comprises an impingement oven with an impingement heating means located below a supporting surface on which a food product is placed and with a radiant heating means located above the supporting surface whereby the bottom surface of the food is heated by an impingement heating process and the top surface of the food is heated by a radiant heating process.

The present invention, in one form thereof, further comprises an impingement oven including a surface for supporting a food product. Impingement heating means is located below the food product for impinging columns of heated air on localized areas of the lower surface of the food product. A radiant panel is located above the food product for heating the top surface of the food product by radiant heat. The panel is heated by means of a stream of heated air which is directed at the panel. The panel surface is preferably black in color.

While in the preferred embodiment of the invention the oven is disclosed as including an impingement heating means and a radiant heating means, the oven could be constructed to include a convection heating means together with a radiant panel heating means. Rather than impinging heated columns of air directly on the food product, the oven could be constructed to have a flow of hot air contact one surface of the food product to heat the surface by convection. A convection stream of hot air could also be provided to supply heat energy to the radiant panel to heat another surface of the food product by radiant energy. Thus, the disclosed impingement heating means could be replaced with a convection heating means so that the rate of heat energy input of the convection means is different than that of the radiant heating means.

In a second embodiment of the invention the radiant heating means comprises a panel which is intregral with an air supply means rather than a panel which is spaced from an air supply means to be heated thereby. The panel comprises a wall portion of an enclosure which receives heated air from a chamber wherein the air is heated and blown by a fan into the enclosure. The amount of air flow to the panel of the second embodiment is much less than to the panel of the preferred embodiment, whereby the amount of heat energy which can be radiated by the panel of the second embodiment is substantially less than the heat energy which can be radiated by a radiant panel of the preferred embodiment.

An advantage of the invention according to the present invention is that the amount of heat energy supplied to various surfaces of the food product can be designed to properly prepare the food in a short amount of time.

Another advantage of the present invention is that a uniform amount of heat energy will be supplied by the radiant heating means whereby the cheese on the top surface of the pizza will be melted and baked to a desired proper white appearance whereas the crust at the bottom of the pizza will be properly browned.

Still another advantage of an oven according to the present invention is that both conventional and stuffed pizza products can be baked in the oven at the same time.

Yet another advantage of an oven according to the present invention is that it is relatively simple to manufacture yet is very efficient and effective in preparing pizzas and other types of food products.

A yet further advantage of an oven according to the present invention is that the radiant panel can be used with either convection or impingement ovens for heating surfaces of food products by means of radiant heat energy.

The present invention, in one form thereof, provides a food preparation oven comprising an enclosure defining a chamber for receiving a food product therein, and means for supporting the food product in the chamber. Impingement means is provided in the chamber for impinging columns of hot air upon a first surface of the food product and radiator means is provided in the chamber for heating a second surface of the food product.

The present invention, in one form thereof, further provides an oven for baking food products comprising a chamber for receiving a food product therein and support means for supporting the food product. Radiator means is provided in the chamber for heating the food product, the radiator means comprising a surface positioned to absorb heat from a stream of heated air and to radiate heat to the food product.

The present invention, in one form thereof, provides an oven for preparing food products comprising an enclosure means for receiving a food product and supporting means in the enclosure for supporting the food product therein. First heating means is provided for supplying heat energy to a first surface of the food product at a first rate and second heating means is provided for supplying heat energy to a second surface of the food product at a second rate, the second heating means comprising a radiant panel.

The present invention, in one form thereof, still further comprises a method for preparing a food product by providing an enclosure for receiving the food product, supporting the food product in the enclosure, heating a first surface of the food product with an impingement heating means and heating a second surface of the food product with a radiant heating means.

It is an object of the present invention to provide a oven for preparing food products wherein heat energy can be supplied at different rates to different surfaces of the food product.

Another object of the present invention is to provide an oven wherein radiant heat energy can be supplied to the top surface of a food product and impingement heat energy can be supplied to the bottom surface of a food product.

Yet another object of the invention is to provide an oven wherein the heat is supplied to one surface of the food product by means of a radiant panel.

A yet further object of the present invention is to provide an oven including a radiant panel and wherein the heat energy is supplied thereto by means of a stream of hot air.

A still further object of the present invention is to provide an oven wherein a radiant panel is provided which is heated by means of impinging columns of hot air thereon.

Still another object of the present invention is to provide a means for heating the top surface of a food product uniformly.

A yet further object of the present invention is to provide an oven for heating a food product by radiant heat and convection which is simple, economical, and efficient.

BRIEF DESCRIPTION OF THE DRAWINGS

The above mentioned and other features and objects of the invention and the manner of attaining them will become more apparent and the invention itself will be better understood by reference to the following description of an embodiment of the invention taken in conjunction with the accompanying drawings, wherein.

Corresponding reference characters indicate corresponding parts throughout the several views of the drawings.

The exemplifications set out herein illustrate a preferred embodiment of the invention, in one form thereof, and such exemplifications are not to be construed as limiting the scope of the disclosure or the scope of the invention in any manner.

DETAILED DESCRIPTION OF THE PREFERRED EMBODIMENT

Figure 1:
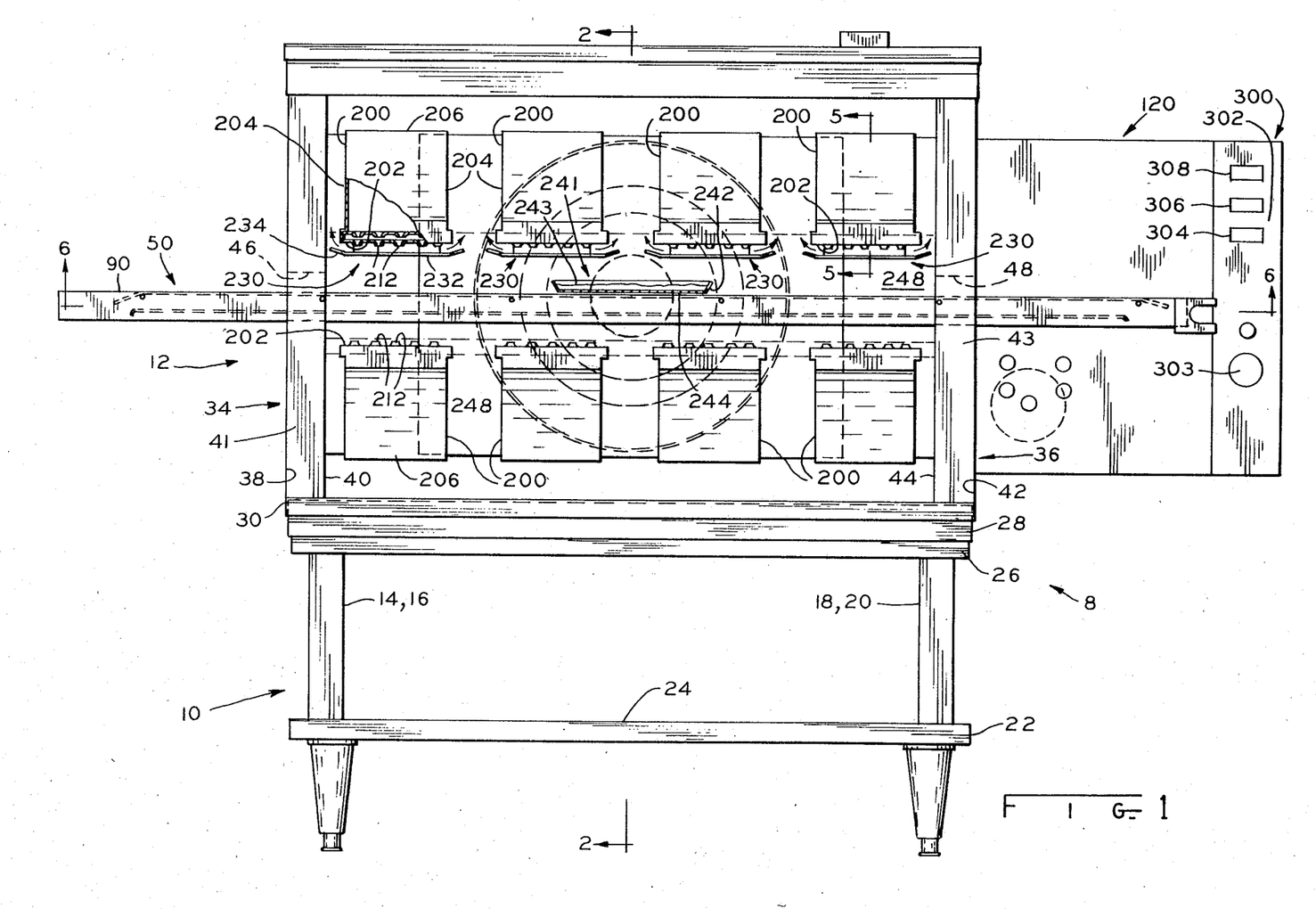
FIG. 1 is a partially broken-away elevational view of an impingement oven.
Figure 2:
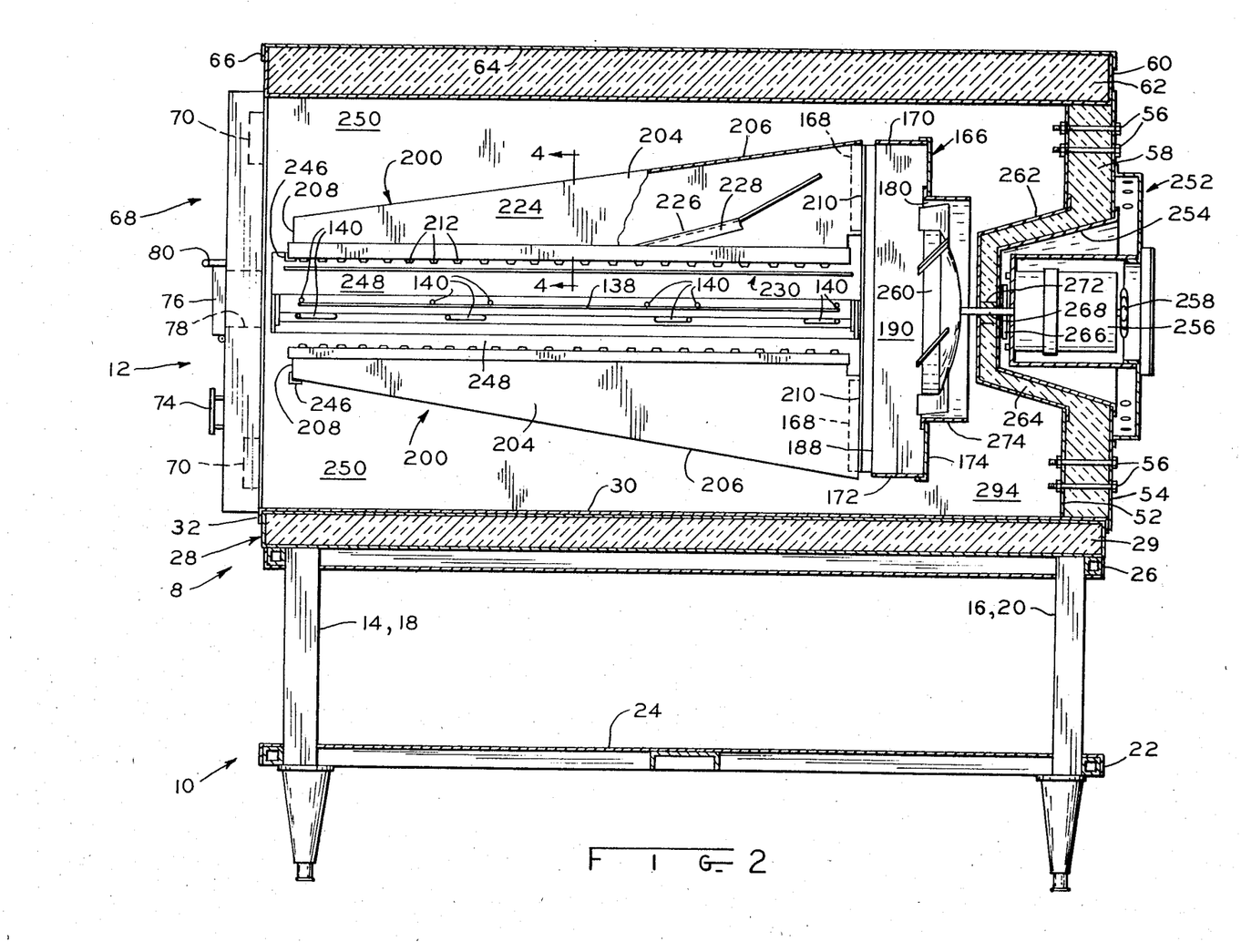
FIG. 2 is a sectional view of the oven of FIG. 1 along line 2—2 as viewed in the direction of the arrows.
Figure 3:
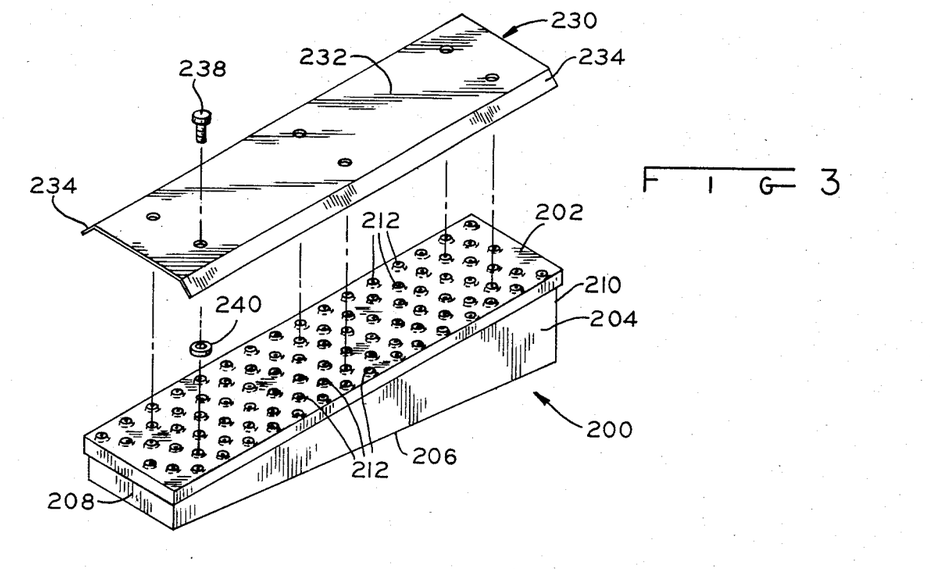
FIG. 3 is a perspective view of a duct finger and radiant panel assembly.

Referring to FIGS. 1 and 2, food preparation apparatus 8 is illustrated including stand assembly 10 and cabinet assembly 12. Stand assembly 10 includes legs 14, 16, 18 and 20. The stand includes a bottom frame 22 secured to legs 14–20 in any suitable manner such as by welding or suitable fasteners. Frame 22 is preferably constructed of stainless steel tubular members as shown. Stand assembly 10 also includes a shelf 24 which is secured to bottom frame 22. Stand assembly 10 further includes a top frame 26 constructed of tubular steel members and secured to legs 14–20 in any suitable manner such as by welding or threaded fasteners. Top frame 26 supports insulation housing 28 in which is located insulation material 29. The entire stand assembly is preferably constructed of stainless steel for durability and cleanability.

The entire stand and cabinet assembly is described in greater detail in U.S. Pat. No. 4,462,383, which is incorporated herein by reference.

Referring now to FIGS. 1 and 2, cabinet assembly 12 includes a base cap 30 which is set upon insulation housing 28 and is secured thereto by means of base cap skirt 32. Base cap skirt 32 extends downwardly from the periphery of base cap 30 over insulation housing 28. Base cap 30 may be constructed of stainless steel for durability and ease in cleaning. Cabinet assembly 12 further includes side wall members 34 and 36. Side wall member 34 includes outer wall 38 and inner wall 40 between which is located insulation material 41. Similarly, wall member 36 includes outer wall 42 and inner wall 44 between which is located insulation material 43. Each of the walls 38, 40, 42 and 44 is made of stainless steel material. The walls are interconnected with base cap 30 by means of welding or the like. Wall members 34 and 36 respectively include passageways 46 and 48 therethrough through which conveyor assembly 50 may be received as illustrated.

The rear portion of cabinet assembly 12 includes an inner wall 52 and an outer wall 54 between which is located insulating material 58. Walls 52 and 54 have their side edges secured to inner walls 40 and 44 as by welding. Furthermore, rear inner and outer walls 52 and 54 are secured together by means of bolt assemblies 56 for further strengthening. Cabinet assembly 12 also includes top insulation housing 60 including a top cap 64 having a top cap skirt 66. Insulation housing 60 houses insulation material 62 and is secured to side walls 38, 40, 44 and 42 and rear walls 52 and 54. All the walls of cabinet assembly 12 are preferably constructed of stainless steel material for durability and cleanability.

Cabinet assembly 12 also includes a door assembly 68 as best illustrated in FIG. 2. Door assembly 68 includes a door 72 hingedly attached to the cabinet by means of hinges 70. Door 70 can be swung open and closed by means of a door handle 74. Door assembly 68 further includes access door 76 which closes off access door opening 78 and includes access door handle 80. Access door 76 is provided to allow the rapid insertion or removal of certain foods in cabinet assembly 12. Access door 76 may also include a window constructed of transparent material.

Figure 6:
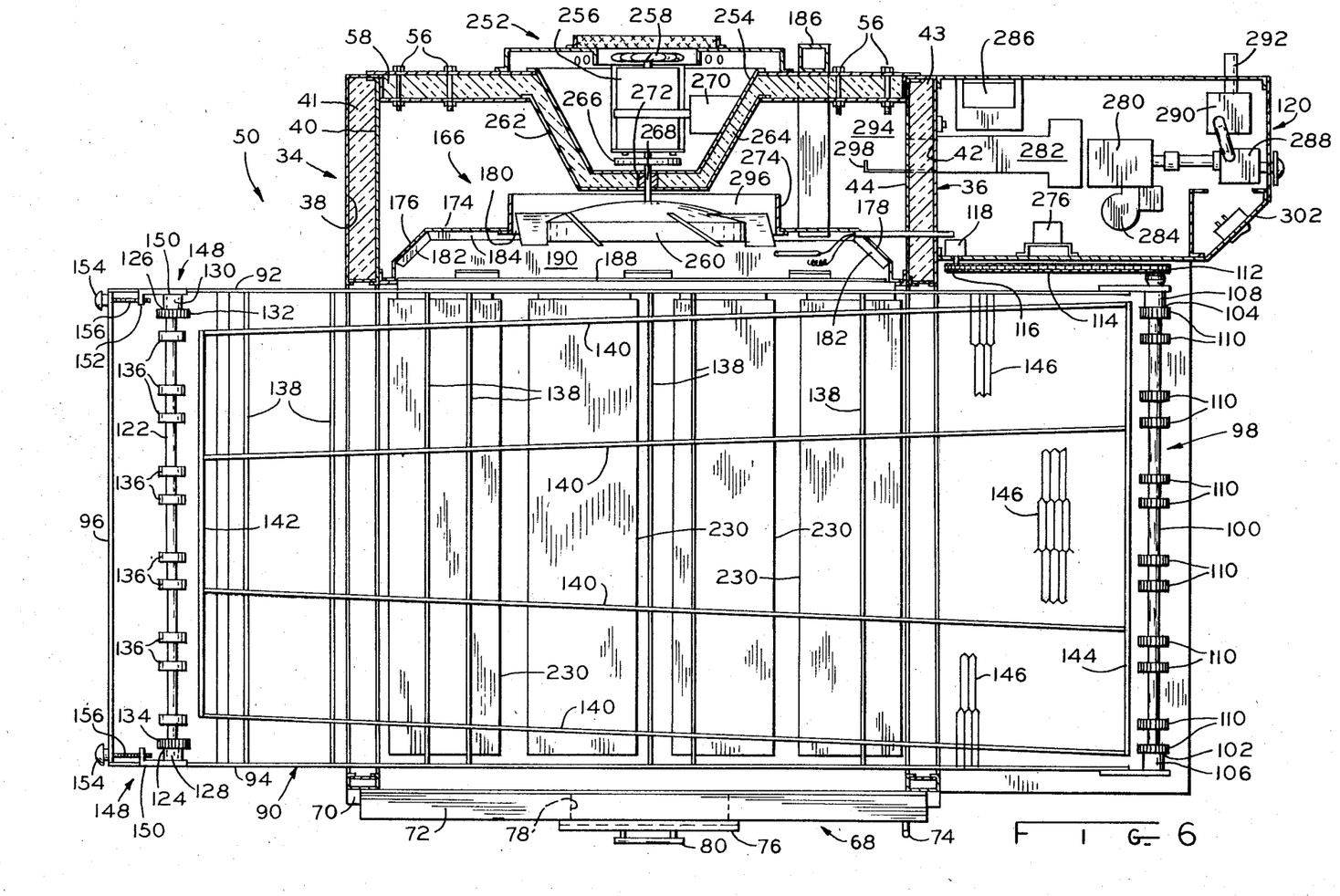
FIG. 6 is a sectional view of the oven of FIG. 1 taken along line 6—6 of FIG. 1.

Referring further to FIGS. 1 and 6, conveyor assembly 60 includes a conveyor frame 90 which extends through passageways 46 and 48 as described hereinabove. Conveyor assembly 50 further includes conveyor frame sides 92 and 94. Conveyor frame 90 also includes a conveyor end portion 96. A shaft assembly 98 is provided opposite conveyor frame end portion 96 and which includes a horizontally disposed conveyor shaft 100 with shaft journal ends 102 and 104. Shaft journal ends 102 and 104 are rotatably received within journal hubs 106 and 108, respectively. Journal hubs 104 and 106 are secured to conveyor sides 92 and 94. Shaft 100 includes a plurality of drive gears 110 secured thereto for driving a conveyor belt 146 mounted within conveyor frame 90. Shaft journal end 104 is rotatably received through conveyor frame side 92 and supports drive sprocket 112 which is secured to shaft 100. Shaft 100 is rotated by means of chain 114 which is engaged with drive sprocket 112 and sprocket 116. Sprocket 116 is rotated by motor 118 located within control center 120.

The end of conveyor assembly 50 opposite shaft 100 includes horizontally disposed idler shaft 122 including journal ends 124 and 126 which are rotatably received within journal hubs 128 and 130, respectively. Journal hubs 128 and 130 are slidably mounted on conveyor frame sides 92 and 94, respectively. Drive gears 132 and 134, which are similar to drive gears 110, are mounted at the respective ends of shaft 122. Shaft 122 further includes a plurality of blank gears 136 which engage with conveyor belt 146. A plurality of cross rods 138 is provided extending between conveyor frame sides 92 and 94 to provide further support for conveyor belt 146. Four support rods 140 are disposed lengthwise of the conveyor and across cross rods 138. Cross rods 138 and support rods 140 are secured together such as by welding. Thus, conveyor belt 146 is supported the entire length of the conveyor by means of the support grid comprising cross rods 138 and support rods 140. FIGS. 1 and 2 clearly show the two vertically spaced planes defined by the interconnecting cross rods 138 and support rods 140, while FIG. 6 illustrates the support rods 140 tapering inwardly from shaft assembly 98 toward conveyor idler shaft 122 for assisting drive gears 110 in centering and tracking conveyor belt 146 moving on support rods 140.

A preferred conveyor belt is constructed of wire link conveyor belting which is placed over drive shaft 100 and idler shaft 122 and upon the two planes of support rods 140 such that drive gear 110 of shaft 100 and drive gears 132 and 134 of idler shaft 122 engage and drive belt 146 when chain 114 and sprocket 116 are actuated by motor 118.

Referring to FIG. 6, the tension of belt 146 can be adjusted by means of adjusting mechanism 148 including L-shaped bracket 150 with bracket end 152. Bracket end 152 includes a threaded hole in which adjusting portion 156 of adjusting mechanism 148 is threadedly engaged for adjustment by means of adjusting knob 154. Thus, as the adjusting knob 154 is rotated, slidable journal hubs 128 and 130 are moved horizontally in the lengthwise direction of the conveyor belt assembly 50 to adjust the tension on conveyor belt 146.

Referring now to FIG. 2, an air supply assembly is disclosed including a plenum 166 having flanges 168 located along the front portion thereof. Plenum 166 includes a top wall 170, a bottom wall 172 and a back wall 174. Plenum 166 also includes angled or tapered plenum sides 176 and 178 as best illustrated in FIG. 6. Plenum sides 176 and 178 are secured to plenum back wall 174 such as by welding. Alternatively, sides 176, 178 and back 174 can be constructed from a single piece of sheet material which is bent to provide tapered side walls 176 and 178. Flanges 182 and 184 are provided on plenum walls 174, 176 and 178 for connecting to plenum wall 172. Plenum 176 also includes a centrally located plenum hole 180 in the back wall 174 thereof through which air can enter into plenum chamber 190. Chamber 190 is formed by front wall 188, back wall 174, side walls 176 and 178, bottom wall 172 and top wall 170.

Turning now to FIGS. 1, 2, 3, 4 and 5 duct fingers 200 are provided for supplying heated air to the cabinet assembly. Duct fingers 200 include jet plates 202, triangular sides 204 and sloping sides 206. Duct fingers 200 also include a front wall 208 and an open back end 210. Flanges 168 of plenum 166 are located in duct finger ends 210 to guide air from plenum chamber 190 into duct finger chamber 224. Fingers 200 are preferably made of stainless steel sheeting and sides 204 and 206 may be stamped from a single sheet of stainless steel. Jet plate 202 includes a plurality of jet openings 212 which are formed in the shape of tubes and which communicate both with finger chambers 224 and the interior cabinet assembly 20. Apertures 212 are formed in such a way that high velocity air exits therefrom in jets or columns.

As best seen in FIG. 2, duct fingers 200 are supported at their front edges by means of support brackets 246. The rear portions 210 of duct fingers 200 are supported by front wall 188 of plenum 166.

Figure 4:
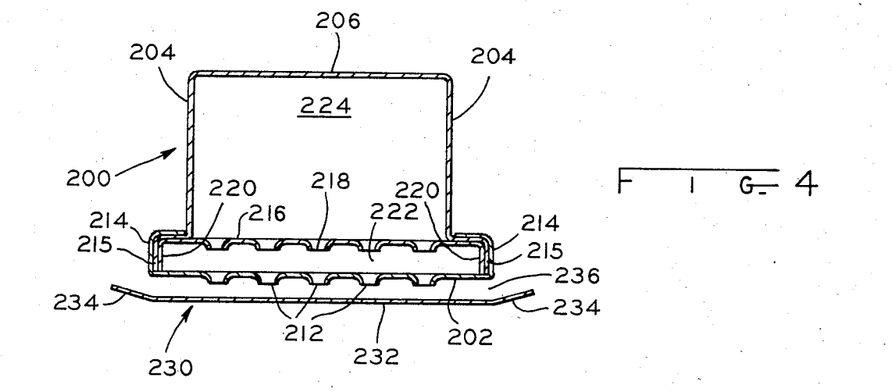
FIG. 4 is a sectional view of the duct finger and radiant panel assembly taken along line 4—4 of FIG. 2.
Figure 5:
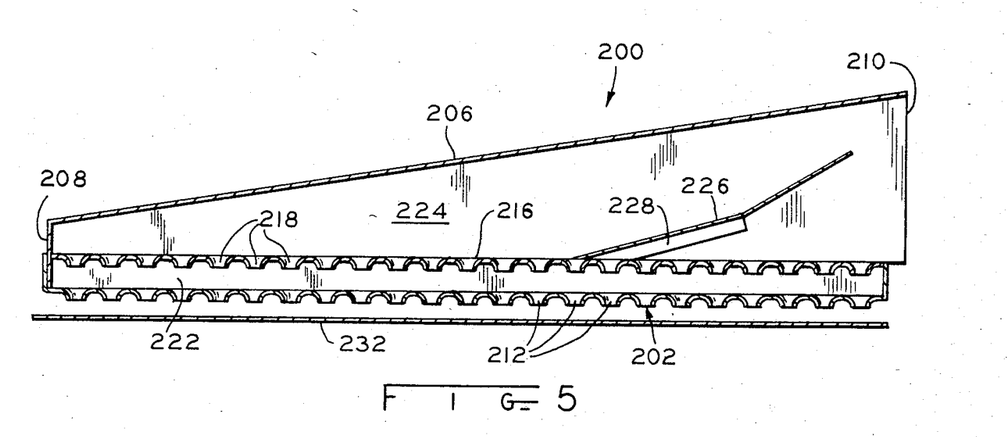
FIG. 5 is a sectional view of a duct finger and radiant panel assembly taken along line 5—5 of FIG. 1.

As best illustrated in FIG. 4 a diffuser plate 216 is provided interiorly of jet plate 202 and spaced apart therefrom. Diffuser plate 216 includes apertures 218 through which high velocity air will be diffused into the space 222 located between diffuser plate 216 and jet plate 212. Triangular sides 204 include bent portions 215 which cooperate with bent portions 220 of diffuser plate 216 and bent sides 214 of jet plate 202 to form a simple yet strong assembly.

Finger chambers 224 also include deflectors 226 which have a width approximately equal to the interior width of chambers 224. Deflectors 226 have one end thereof secured such as by spot welding to sides 204 of fingers 200. Each deflector 226 includes a pair of flanges 228 extending from its side edges toward diffuser plate 216 from the front edge of deflector 226 to a point approximately midway along deflector 226. This portion of deflector 226 is stationary while the remaining portion is moveable in order to apportion the incoming air flow within chamber 224. As can be seen in FIG. 2 deflector 226 has its front edge secured to sides 214 at a point approximately one third of the distance from back end 210. Without deflectors 226, air leaving plenum chamber 190 and entering finger chamber 224 would move directly to the front portion of fingers 200 due to its high velocity. Deflector 226 deflects a portion of the air flow entering chamber 224 from chamber 190 and deflects that air through openings 212 which lie in the back one-third portion of fingers 200. Thus, high velocity air will exit from all openings 212 in a uniform distribution across jet plate 202.

Referring now to FIGS. 1, 2, 3, 4 and 5 radiator plates 230 are shown located below jet plates 202 of duct fingers 200 in the top portion of the oven enclosure formed by the walls of cabinet assembly 12. Radiators 230 are located above conveyor assembly 50 in the space between the top of conveyor assembly 50 and jet plates 202 of duct fingers 200. Radiator panels 230 include a flat or planar portion 232 and tapered side portions 234. Radiators 230 are spaced apart from jet plates 202 by space 236. Radiators 230 are secured to fingers 200 by means of threaded fasteners 238 or the like which engage with threaded apertures in jet plates 202. Radiators 230 are spaced from jet plates 202 by tubular spacers 240 and threaded fasteners 238 whereby spaces 236 separate radiators 230 from jet plates 202. Spacers 240 are dimensioned to provide proper spacing for radiators 230. A separation distance of 1/16" to ¼" between radiators 230 and plates 202 has been found to be acceptable for proper operation. However, proper spacing is a function of many factors such as temperatures and flow volume and this invention is not limited to the dimensional range herein disclosed. Any suitable number of fasteners 238 may be provided for fastening radiators 230 to duct fingers 200.

It can be readily appreciated that air flowing from plenum chamber 190 into duct finger chambers 224 and out of openings 218 in diffuser plates 216 through spaces 222 and out of jet plate apertures 212 will impinge upon radiators 230 and be deflected thereby and will pass outwardly through spaces 236 along side portions 234 of radiator 230 and back to the air supply assembly. However, since the air flowing through finger chambers 224 is hot air, heat will be given up to radiator 230 as the air impinges upon the radiator. Radiators 230 therefore will be of substantially the same temperature as the hot air impinging thereupon and will transfer that heat by radiant heat downwardly toward conveyor assembly 90 and to the food products supported thereon.

Radiators 230 are preferably constructed of sheet aluminum for good heat conduction whereby the radiators will radiate heat uniformly to the food products. A radiator panel of a thickness of 0.081 inch has been found to work satisfactorily. Alternatively radiators 230 may be constructed of aluminized steel. Furthermore, radiators 230 are preferably black in color so that they will act as "black bodies" for good heat absorption and radiation. The radiator is therefore preferably constructed of anodized aluminum. An anodized finish consisting of sulfuric anodized Type III hard coat to a depth of 0.0015 to 0.002 inch has been found to be satisfactory. This process is well known in the prior art and need not be explained further herein. It has been found that radiators consisting of aluminum having a thickness of 0.081 will operate satisfactorily in an impingement oven of the present invention.

It should also be understood that closeoff caps can be used for closing off certain of apertures 212 in jet plates 202 in order to prevent heated air from flowing out of finger chambers 224. In this way, desired portions of jet plates 202 can be made impervious to air and, therefore, heated air will only reach certain portions of radiators 230. By selectively heating portions of radiators 230, heat will be radiated selectively to only certain portions of conveyor assembly 50. Therefore, heat energy will be radiated selectively to only portions of conveyor assembly 50. Similarly, bottom duct fingers 200 could have portions of jet plates 202 closed off by closeoff caps thereby preventing air from impinging on portions of conveyor assembly 50 and the bottom surfaces of food products located thereon. Alternatively, jet plates 202 of the upper duct fingers 200 can be completely closed off to prevent any heat energy from being transferred by convection to radiators 230 and to thereby prevent heating of the upper surfaces of food products located on conveyor assembly 50.

By means of finger ducts 200 in the oven cavity a cooking chamber 248 is provided through which food products will pass as they are carried by conveyor assembly 50. FIG. 1 shows a food product 241 in pan 242 supported by conveyor assembly 50. The food product has a top surface 243 and bottom surface 244. The top surfaces of the food products will be heated by means of heat radiated downwardly by radiators 230 and the bottom surfaces of the food products will be heated by means of upward impingement of heated air thereupon from lower duct fingers 200. By virtue of the construction disclosed, a great deal more heat energy will be transferred to the food products by means of the impingement heating process than by means of the radiant heating process. Therefore, the disclosed oven arrangement is particularly suited to foods wherein the top surface of the food should be gently but uniformly heated and wherein the bottom surface of the food product should be heated with a great amount of heat energy as explained hereinabove. One such food product which must be prepared in this way is pizza wherein the top layer generally consists of one or more kinds of cheese and upon which may be placed toppings such as mushrooms or onions which are quite easily burned. The heating of these upper surfaces by means of the radiator is gentle yet uniform since the entire radiator will be heated by means of the impingement of hot air thereupon as explained hereinabove. It has been found that cheeses, once melted, do not allow much heat to pass therethrough to the interior of the pizza. Therefore, if the top surface of a deep dish pizza were heated by means of am impingement process, the heat energy would not be able to penetrate the melted cheese and would tend to burn the cheese rather than producing a desired milky white melted cheese layer. A pizza bottom consists of a crust which must be browned and through which heat energy must pass to cook the interior of the pizza. It has been found that in ovens according to the present invention adequate amounts of heat energy can enter the bottom crust of the pizza to cook the inside properly and to brown the crust while the edge of the top surface of the pizza is heated just sufficiently by radiant heat to melt the cheese and to turn it a milky white color with just some brown spots and to brown the edges of the pizza crust at the top surface of the pizza. While an oven according to the instant invention is particularly suited to cooking deep dish or stuffed pizzas therein, the oven can be used to cook conventional thin pizzas at the same time. Thus, the oven may contain at the same time thin conventional pizza products and deep dish or stuffed pizzas whereby the operator of the fast food pizza restaurant does not need to provide two types of ovens for cooking the different types of pizzas.

Continuing now by referring to FIGS. 2 and 6 an air return chamber 250 is formed by duct fingers 200, inner walls 40, 44 and 52 and door assembly 68. A motor assembly is provided for rotating an impeller 260 and including a motor 256 mounted on a bracket 270 which is attached to frusto-conically shaped interior shroud 254. Impeller shroud 262 is spaced from interior shroud 254 as shown and the space formed thereby contains insulating material 264. Interior shroud 254 and impeller shroud 262 include aligned apertures through which motor shaft 268 passes. Motor shaft 268 also includes a heat conductor 266 for directing heat away from motor 256. A collar 274 surrounds impeller 260 and aids in guiding air to impeller 260.

Control center 120 includes a burner head 280 and burner housing 282. A burner fan 284 supplies air to the burner for proper combustion of gas which flows into burner head 280 through gas inlet pipe 292 and gas valve 290. Heating chamber 294 is provided for heating air by means of a flame from burner head 280 and burner housing 282. A modulating control 288 is provided for modulating the flow of gas to burner head 280 to control the temperature to which the air is heated as it flows through heating chamber 294 and into the cooking chamber 248. The flame produced by burner 280 and burner housing 282 is shaped by means of flame shaper 298 which is attached to interior cabinet wall 44. The flame is located within the bottom portion of heat chamber 294 and has its heat energy drawn transversely across heat chamber 294 by means of impeller 260 for reheating recirculated air. The parts of the burner assembly, such as the orifice and gas piping and the operation thereof, are not illustrated herein since such parts and the operation thereof are conventional and are well known in the prior art. Gas valve 290 is a conventional type valve and is controlled by means of modulating control 288 which in turn is controlled by means of a thermostat bulb (not shown). The thermostat bulb is located to sense the temperature of the rapid air movement within plenum chamber 190 and provides a control input to modulating control 288.

As seen in FIG. 1, a control panel 302 is provided including controls 300 for controlling the oven. Controls 300 include a speed control switch 303, a conveyor switch 304, a burner switch 306 and an impeller switch 308. The operation of the controls is conventional and is well known in the prior art.

While a gas fueled heating means is disclosed herein, it should be understood that electric heating means can also be used for heating the air supply.

Referring now to FIG. 2, a description of the air flow during its recirculation within cabinet assembly 20 is as follows. Initially, heated high velocity air at a temperature of approximately 450° flows from heating chamber 294 past collar 274 and impeller 260 into plenum chamber 190. The heated air will then flow into chambers 224 of duct fingers 200 through the open ended back portions 210 of the duct fingers. The heated air will then flow through apertures 218 in diffuser plates 216, through spaces 222 and through apertures 212 in jet plates 202. As columns of heated air pass through apertures 212 in duct fingers 200 which are located below conveyor assembly 50, the columns of heated air will impinge upon the bottom surfaces of food products supported by conveyor belt 146. The heated air flowing through apertures 212 in jet plates 202 in the duct fingers 200 located above conveyor assembly 50 will impinge upon the radiators 230 spaced therefrom by spaces 236, and heat the radiators 230 to approximately 450°. The radiators thereupon will radiate heat energy uniformly to the top surfaces of food products located upon conveyor belt 146. The air after passing through the jet plates will then recirculate through air return chamber 250 and heating chamber 294 to be heated therein.

While this particular embodiment discloses the addition of radiators to an impingement oven, the radiators can be applied equally well in an oven wherein a flow of heated air is established such as, for instance, convection ovens. What is necessary is that the radiators are positioned in such a way with respect to the flow of heated air that the radiators will efficiently absorb heat energy therefrom and will radiate heat energy to the food products. Thus, it may be desired in a convection oven to heat certain surfaces of the food by means of a convection process while at the same time heating another surface of the food by means of radiant energy. Thus, by the proper positioning of a radiator with respect to the hot air flow, the radiator will function in the same way as in the embodiment described hereinabove in connection with the impingement oven.

It should also be noted that if desired, the radiators may be located adjacent the duct fingers which are positioned below the conveyor assembly 50 in order to supply radiant energy to the bottom surfaces of food products located on conveyor belt 146.

Figure 7:
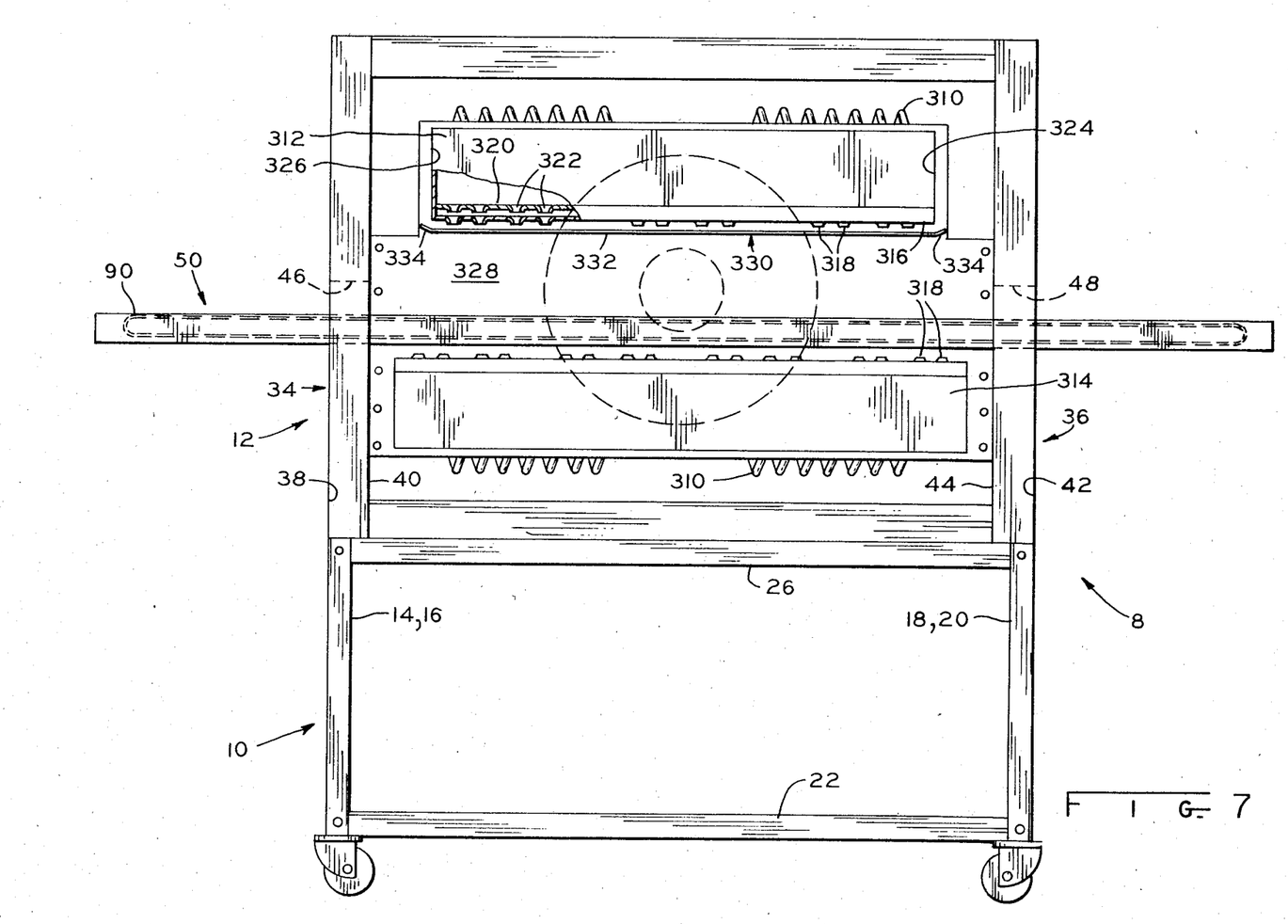
FIG. 7 is an elevational partially broken-away view of another embodiment of the present invention.
Figure 8:
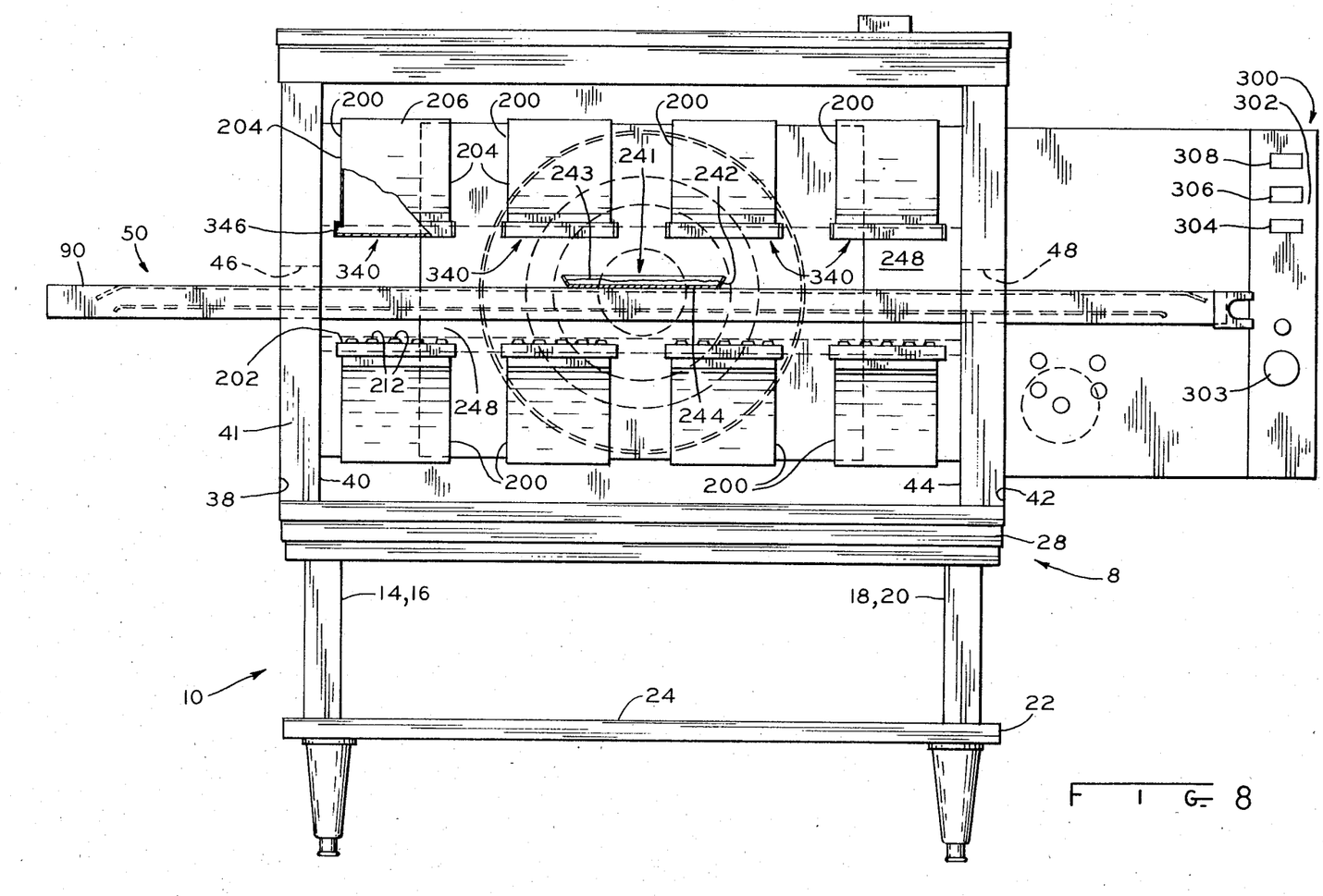
FIG. 8 is a partially broken away elevational view of an impingement oven with a second embodiment of a radiant panel assembly.

Referring now to FIG. 7 what is disclosed is an alternate embodiment of the present invention. A food preparation apparatus 8 is disclosed including a stand assembly 10 and a cabinet assembly 12. The stand assembly includes legs 14, 16, 18 and 20. The stand assembly also includes a bottom frame 22 and a top frame 26. The frame is preferably constructed of tubular stainless steel.

Wall members 34 and 36 including inner walls 40 and 44 and outer walls 38 and 42 are provided to form an oven enclosure. A conveyor assembly 50 including conveyor 90 is provided as described hereinabove. Conveyor 90 passes through apertures 46 and 48 in walls 38-44. Electric heating coils 310 are provided for heating air to be supplied through top finger duct 312 and bottom finger duct 314. Jet plates 316 are provided including apertures 318. Diffuser plates 320 are provided as shown in the cut-away portion of upper finger duct 312. Diffuser plate 320 includes apertures 322. Duct 312 includes side walls 324 and 326. A cooking chamber 328 is formed between upper finger duct 312 and lower finger duct 314. As opposed to the embodiment of FIGS. 1-6, the present embodiment includes only a single duct finger 312 above conveyor assembly 50 and a single duct finger 314 below conveyor assembly 50. Accordingly, a single radiator 330 is provided spaced apart from jet plate 316 and including a planar portion 332 and tapered side portions 334. It can therefore be appreciated that air flowing through apertures 318 will impinge upon radiator 330 to heat radiator 330 whereby it can emit radiant heat energy to food products located on conveyor assembly 50 as described hereinabove in connection with the embodiment disclosed in FIGS. 1-6.

Figure 9:
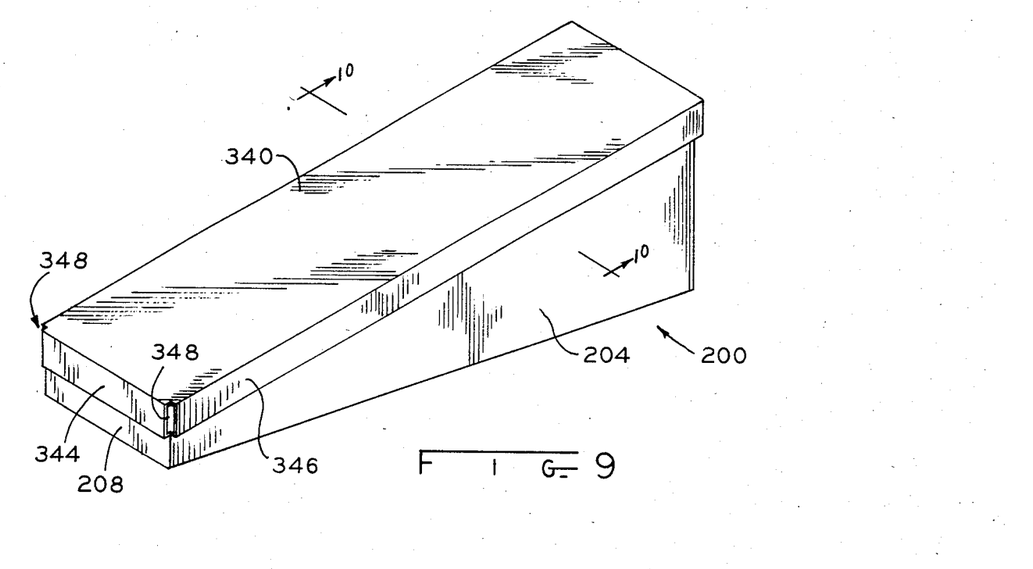
FIG. 9 is a perspective view of a duct finger and radiant panel assembly according to a second embodiment of the invention.
Figure 10:
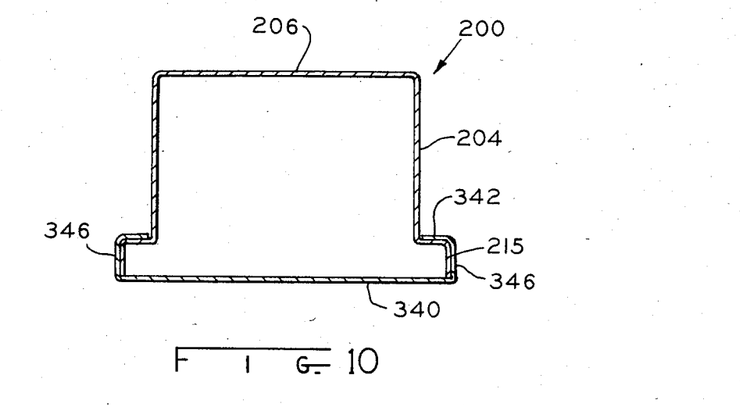
FIG. 10 is a sectional view of a duct finger and radiant panel assembly taken along line 10—10 of FIG. 9.
Figure 11:
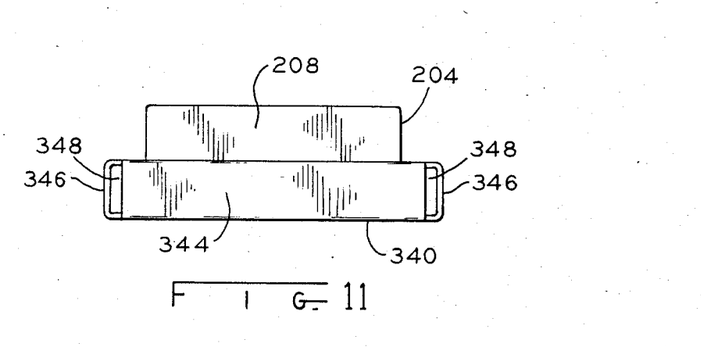
FIG. 11 is a front elevational view of the duct finger and radiant panel assembly of FIG. 9.

Referring now to FIGS. 8, 9, 10 and 11 and alternate embodiment of the present invention is disclosed wherein, instead of having a panel spaced apart from the duct fingers as shown in the embodiment of FIGS. 1-7, the panel is part of the duct finger enclosure. Referring first to FIG. 9 it can be seen that radiant panel 340 is an intregal part of the duct finger enclosure. FIG. 10 shows a cross section of the duct finger along the line 10—10 of the duct finger enclosure of FIG. 9. Top panel 206 and triangular side panel 204 include a flange 215 around which is wrapped flange 342 of radiant panel side portion 346. Similarly, by referring to FIG. 11, it can be seen that front portion 344 of panel 340 is wrapped around the front portion 208 of the duct finger. Thus panel 340 can be formed of a single sheet. Corner portions of the sheet are removed whereby flanges 342, 344 and 346 are formed. By removing corner portions from the metal sheet and then bending the flange portions 344 and 346 as shown, aperatures 348 will be formed whereby heated air flowing into the duct finger through the back 210 of the duct fingers can escape, in the process heating radiant panel 340. It is readily apparent that the amount of air which can escape through openings 348 is substantially smaller than the amount of air which escapes through impingement duct fingers containing impingement openings 212 as shown in the embodiment of FIGS. 1-7. Therefore the amount of heat energy which can be supplied by radiant panel 340 is less than the amount of heat energy which can be supplied by a radiant heat panel of similar size as shown in the embodiment disclosed in FIG. 1-7. For certain types of foods requiring little heat input into one surface the radiant panel arrangement of FIGS. 8-11 is preferable.

While the invention as disclosed herein has been illustrated in connection with heating pizzas the application is applicable to numerous other types of food products and the use of a pizzas in the description of the invention is intended for illustrative purposes only and not intended to limit the scope of the invention.

It should also be understood that the invention is equally applicable to the preparation of food products wherein the top surface requires a rapid rate of heating input and the bottom surface of the food product requires a lesser amount of heat energy input. Thus the impingement fingers would be located above the conveyor apparatus and the radiant panel would be located below the conveyor apparatus. Similarly the invention is applicable to ovens wherein no conveyor is utilized but wherein the food product remains stationary within the oven cavity.

While this invention has been described as having a specific embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. A food preparation oven comprising:
   an enclosure defining a chamber for receiving a food product therein;
   means for supporting a food product in said chamber;
   impingement means in said chamber for impinging columnated jets of heated air against discrete points on a first surface of said food product;
   radiant heating means in said chamber for uniformly heating a second surface of said food product.

2. The oven of claim 1 wherein said radiant heating means comprises a panel for providing radiant heat to said food product second surface and heating means for supplying heat to said panel.

3. The oven according to claim 1 wherein said radiant heating means comprises a panel positioned intermediate a heater and said food product, whereby said panel absorbs heat from said heater and supplies radiant heat to said food product.

4. The oven according to claim 2 wherein said heater means comprises means for heating a supply of air and air moving means for causing said heated supply of air to flow over and heat said panel.

5. The oven according to claim 2 wherein said panel is black.

6. The oven according to claim 2 wherein said panel is composed of anodized aluminum.

7. The oven according to claim 2 wherein said heater means comprises impingement means for causing columns of heated air to impinge upon localized areas of said panel.

8. The oven according to claim 2 wherein said panel comprises one of the sides of a duct means for conducting a stream of heated air from a heater and an air circulating means, said panel positioned adjacent the seocnd surface of said food product.

9. The oven according to claim 1 werein said impingement means is positioned below said food supporting means for heating the bottom surface of said food product and wherein said radiant means is positioned above said food supporting means for heating the top surface of said food product.

10. An oven for baking food products comprising;
a chamber for receiving a food product therein;
support means for supporting said food product;
air moving means;
first heating means for heating a stream of air moved by said air moving means;
readiator means in said chamber for heating said food product at a first rate, said radiator means comprising a surface positioned to absorb heat from said stream of heated air and to radiate heat energy to said food product;
said oven including second heating means for supplying heat energy to a second surface of said food product at a second rate different from said first rate.

11. The oven according to claim 10 wherein said radiator means comprises a flat panel, said panel positioned to cause said stream of hot air to be deflected thereby and heating means for heating said stream of air.

12. The oven according to claim 10 wherein said panel comprises a side of a conduit means for conducting a stream of heated air, said conduit means including an outlet aperature for permitting air to flow from said conduit.

13. The oven according to claim 10 wherein said radiator means comprises an aluminum panel.

14. The oven according to claim 10 wherein said radiator means comprises a black anodized aluminum panel.

15. The oven according to claim 10 wherein said stream of heated air comprises a plurality of columns of hot air which are impinged upon localized areas of said surface.

16. An oven for preparing food products comprising;
enclosure means for receiving a food product;
supporting means in said enclosure for supporting the food product therein;
first heating means for supplying heat energy to a first surface of said food product at a first rate;
second heating means for supplying heat energy to a second surface of said food product at a second rate, said second heating means including a means for supplying a continuous stream of air, means for heating said stream of air, and a radiant panel positioned in said stream of heated air to be heated thereby.

17. The oven according to claim 16 wherein said means for supplying said stream of air comprises means for forming a plurality of columnated jets of air and means for directing said jets substantially perpendicularly to said panel.

18. The oven according to claim 16 wherein said means for supplying said stream of hot air comprises a conduit, said panel comprising one side of said conduit and positioned adjacent the second surface of said food product.

19. The oven according to claim 16 wherein said first heating means comprises impingement means for impinging heated columns of hot air against localized areas of said food product first surface.

20. The oven according to claim 16 wherein said first surface is the lower surface of said food product and the second surface is the upper surface of said food product and wherein said first rate is greater than said seocnd rate.

21. The oven according to claim 16 wherein said first heating means comprises convection means for heating said food product first surface by convection.

22. A food preparation oven comprising:
an enclosure defining a chamber for receiving a food product therein;
means for supporting a food product in said chamber;
convection means in said chamber for heating a first surface of said food product;
radiant heating means in said chamber for heating a second surface of said food product, said radiant heating means comprising a panel which is heated by impingement of columnated jets of heated air upon localized areas of said panel.

23. A method for preparing a food product comprising:
providing an enclosure for receiving the food product;
supporting said food product in said enclosure;
heating a first surface of said food product with an impingement heating means, said impingement heating means impinging columnated jets of heated air upon localized areas of said first surface; and
heating a second surface of said food product with a radiant heating means.

24. The method of claim 23 wherein said radiant means comprises a panel and wherein said panel is heated by a stream of hot air.

25. The method of claim 23 wherein said first surface is a bottom surface and wherein said second surface is a top surface.

* * * * *

UNITED STATES PATENT AND TRADEMARK OFFICE
CERTIFICATE OF CORRECTION

PATENT NO. : 4,591,333
DATED : May 27, 1986
INVENTOR(S) : Mitchell C. Henke

It is certified that error appears in the above-identified patent and that said Letters Patent is hereby corrected as shown below:

Claim 8, Col. 13, line 26, change "seocnd" to --second--.

Claim 9, Col. 13, line 28, change "werein" to --wherein--.

Claim 10, Col. 13, line 34, change ";" to --:--.

Claim 10, Col. 13, line 40, change "readiator" to --radiator--.

Claim 16, Col. 14, line 3, change ";" to --:--.

Claim 20, Col. 14, line 33, change "seocnd" to --second--.

Signed and Sealed this

Second Day of September 1986

[SEAL]

Attest:

DONALD J. QUIGG

Attesting Officer  Commissioner of Patents and Trademarks